United States Patent [19]

Takahashi et al.

[11] Patent Number: 4,930,191
[45] Date of Patent: Jun. 5, 1990

[54] HOSE CLAMP

[75] Inventors: Yasuo Takahashi; Toshinari Hojima, both of Yokohama, Japan

[73] Assignee: Kato Hatsujo Kaisha, Ltd., Kanagawa, Japan

[21] Appl. No.: 363,988

[22] Filed: Jun. 9, 1989

[30] Foreign Application Priority Data

Jul. 4, 1988 [JP] Japan .................. 63-88040

[51] Int. Cl.⁵ .............................. B65D 63/02
[52] U.S. Cl. .................. 24/20 R; 24/20 CW
[58] Field of Search ............. 24/20 R, 20 CW, 20 S, 24/20 TT, 20 EE, 22, 279

[56] References Cited

U.S. PATENT DOCUMENTS

| | | | |
|---|---|---|---|
| 1,373,673 | 4/1921 | Ritter | 24/279 |
| 4,305,179 | 12/1981 | Sakurada | 24/20 R |
| 4,523,352 | 6/1985 | Wachter | 24/20 CW |
| 4,773,129 | 9/1988 | Muhr | 24/20 R |

FOREIGN PATENT DOCUMENTS

| | | | |
|---|---|---|---|
| 549701 | 2/1923 | France | 24/279 |
| 57-103920 | 6/1982 | Japan. | |
| 339065 | 12/1930 | United Kingdom | 24/279 |

Primary Examiner—Victor N. Sakran
Attorney, Agent, or Firm—Wenderoth, Lind & Ponack

[57] ABSTRACT

A hose clamp includes an annular clamp body having a first terminal portion and a second terminal portion. The first terminal portion has a guide opening, a lock wall defined between the guide opening and the leading end of the first terminal portion, and side walls disposed across the guide opening and folded back over themselves in a substantially U-shaped cross section having an upper side piece and a lower side piece. The second terminal portion has a radially outwardly bent wall serving as an engaging tongue piece. The clamp body is kept in a radially expanded state when the engaging tongue piece of the second terminal portion abuts against the lock wall of the first terminal portion and is radially contracted when the abutment between the engaging tongue piece and the lock wall is released to move the engaging tongue piece within the guide opening.

1 Claim, 4 Drawing Sheets

HOSE CLAMP

BACKGROUND OF THE INVENTION AND RELATED ART STATEMENT

This invention relates to a hose clamp used particularly for the purpose of clamping a rubber hose, for example.

A hose clamp which has found extensive utility is disclosed in U.S. Pat. No. 4,305,179 and constructed by forming a clamp body in an annular shape and bending the opposite terminal pars of the clamp body in a mutually crossing manner, thereby clamping a rubber hose, for example, by virtue of the clamping resilient force generated by the clamp body. Various techniques have been proposed concerning the hose clamp.

In almost all of the conventional hose clamps of this type, since the mutually crossing opposite terminal parts thereof are raised upright to a large height outwardly in the radial direction, persons engaging in the work of putting such clamps on a rubber hose often suffer from unforeseen accidents. Even after these hose clamps have been put on rubber hoses, they are liable to bring about similar accidents.

An improved hose clamp having the opposite terminal parts of its clamp body bent upright in a mutually crossing manner to a decreased height has been disclosed in Japanese Patent Public Disclosure No. 57-103920. This prior art hose clamp is molded from one resilient Metallic sheet and formed by looping the metallic sheet into an annular clamp body, stamping a first terminal part of the annular clamp body into a lock wall which has a part extending in the radial direction and another part extending in the tangential direction and consequently assuming a substantially L-shaped cross section, perforating an opening in the radially extending part of the lock wall, and punching a guide groove so as to extend continuously from the opening through the clamp body. A second terminal part of the clamp body is given a width small enough to move inside the opening and the guide groove and has the leading end thereof bent upwardly. Thus, the bent leading end of the second terminal part can be joined to the lock wall of the first terminal part.

In the prior art hose clamp, therefore, the union of the curved leading end of the second terminal part with the lock wall of the first terminal part allows the clamp body to be retained in a radially expanded state and, at the same time, gives rise to an insertion space between the second terminal part and the tangentially extending part of the lock wall.

Owing to this construction, the actual use of the prior art hose clamp is attained by placing the curved leading end of the second terminal part into engagement with the lock wall of the first terminal part, thereby setting the clamp body in a radially expanded state, inserting the clamp body around a rubber hose, then inserting the leading end of such a tool as a slotted screwdriver into the insertion space formed between the second terminal part and the tangentially extending part of the lock wall, jerking the tangentially extending part of the lock wall, jerking the tool and depressing the second terminal part down, thereby releasing the bent leading end of the second terminal part from the union thereof with the lock wall and allowing the second terminal part to move through the opening in the lock wall to the inside of the guide groove by virtue of the resilient force of the clamp body itself and further permitting the clamp body to radially contract instantaneously, with the result that the rubber hose is automatically clamped.

The prior art hose clamp has an advantage that the work of clamping a rubber hose is simple because the clamp body automatically acquires its radially contracted state by merely disengaging the curved leading end of the second terminal part from the lock wall by the use of such a tool as a slotted screwdriver as described above. Actually, on account of the construction, the release of the curved leading end of the second terminal part from the union with the lock wall can be attained only when the leading end to the tool is inserted in the direction of the lateral side of the clamp body into the insertion hole formed between the second terminal part and the tangentially extending part of the lock wall. This release of the curved leading end cannot be attained in any other direction. Therefore, the prior art hose clamp has a disadvantage that owing to the restriction imposed by the directionality of the tool to be used, the hose clamp itself, depending on the condition of its attachment to the rubber hose, defies insertion of the tool to impair its workability.

Where the prior art hose clamp must be removed from the rubber hose for the purpose of reuse, since the part of the hose clamp which can be nipped with such a tool as pliers is short, it is extremely difficult for the clamp body to be spread out against the resilient force of its own and set into a radially expanded state again.

OBJECT AND SUMMARY OF THE INVENTION

The main object of the present invention is to provide a hose clamp which is not restricted by the direction for the insertion of a tool to be used in effecting radial contraction of the clamp body kept in a radially expanded state.

To accomplish this object, according to the present invention there is provided a hose clamp comprising an annular clamp body having a first terminal portion and a second terminal portion, the first terminal portion having a guide opening, a lock wall defined between the guide opening and the leading end of the first terminal portion, and side walls disposed across the guide opening and folded back over themselves in a U-shaped cross section having an upper side piece and a lower side piece, the second terminal portion having a radially outwardly bent wall serving as an engaging tongue piece, the clamp body being kept in a radially expanded state when the engaging tongue piece of the second terminal portion abuts against the lock wall of the first terminal portion and being radially contracted when the abutment between the engaging tongue piece and the lock wall is released to move the engaging tongue piece within the guide opening, the lock wall having a protruding central part with a notch, a first tool insertion space being defined between the upper and lower side pieces of the side wall, a second tool insertion space being defined between the lower surface of the protruding central part and the upper end surface of the engaging tongue piece, and a third tool insertion space being defined between the notch and the front surface of the engaging tongue piece.

The above and other objects, characteristic features and advantages of the present invention will become more apparent to those skilled in the art as the disclosure is made in the following description of a preferred embodiment of the invention, as illustrated in the accompanying drawings.

DETAILED DESCRIPTION OF THE PREFERRED EMBODIMENT

Figure 1:
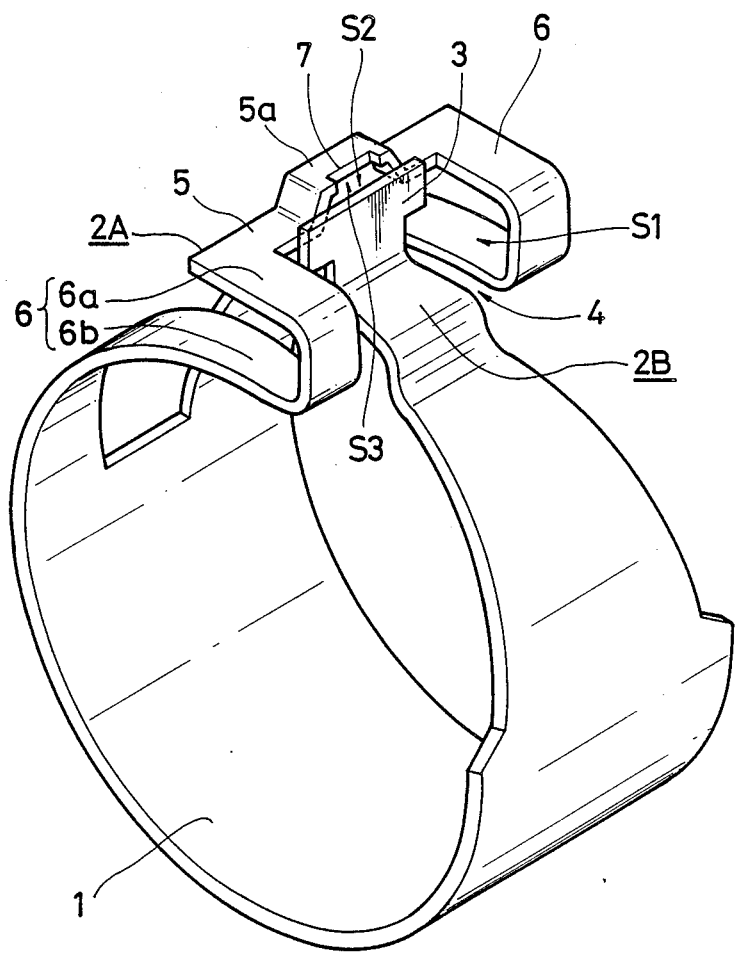
FIG. 1 is a perspective view illustrating one embodiment of the hose clamp according to the present invention, with a clamp body held in a radially expanded state.

Now, the present invention will be described hereinbelow with reference to one embodiment illustrated in the accompanying drawings.

The hose clamp of this embodiment comprises an annular clamp body 1 having a first terminal portion 2A and a second terminal portion 2B. The clamp body 1 is held in a radially expanded state by engagement of the second terminal portion 2B with the first terminal portion 2A and is radially contracted automatically by disengagement of the second terminal portion 2B from the first terminal portion 2A.

As illustrated in FIG., 1 the first terminal portion 2A has a guide opening 4, a lock wall 5 defined between the guide opening 4 and a free end of the first terminal portion 2A, and side walls 6 disposed across the guide opening 4 and folded back over themselves in a U-shaped cross section having an upper side piece 6a and a lower side piece 6b. The second terminal portion 2B has a radially outwardly bent wall serving as an engaging tongue piece 3. The guide opening 4 of the first terminal portion 2A permits motion therein of the engaging tongue piece 3 of the second terminal portion 2B. The engaging tongue piece 3 of the second terminal portion 2B is brought into abutment through the guide opening 4 against the lock wall 5 of the first terminal portion 2A in the state of FIG. 1 in which the clamp body 1 is kept expanded in the radial direction. The lock wall 5 is provided with a protruding central part 5a which has a notch 7 facing the front surface of the engaging tongue piece 3 in the aforementioned state of FIG. 1.

Figure 3:
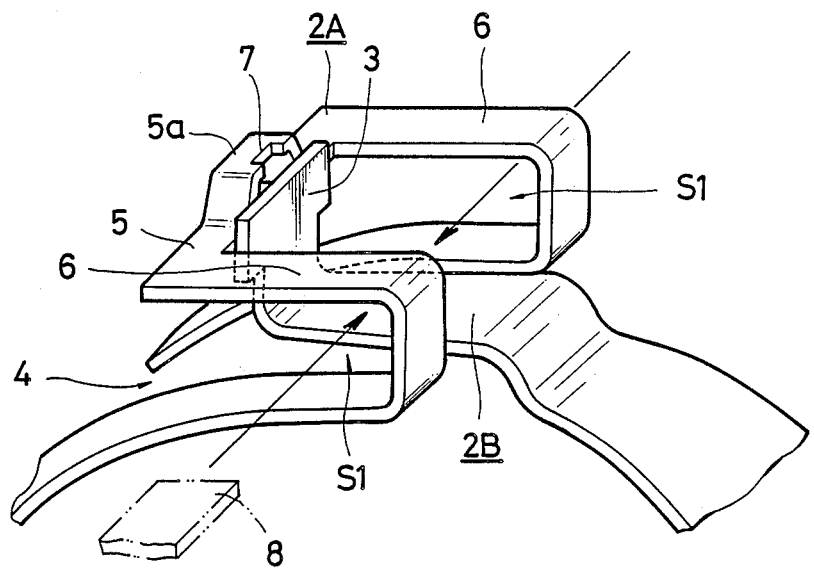
FIG. 3 is a partially cutaway enlarged perspective view illustrating a first tool insertion space used for disengagement between an engaging tongue piece and a lock wall.
Figure 4:
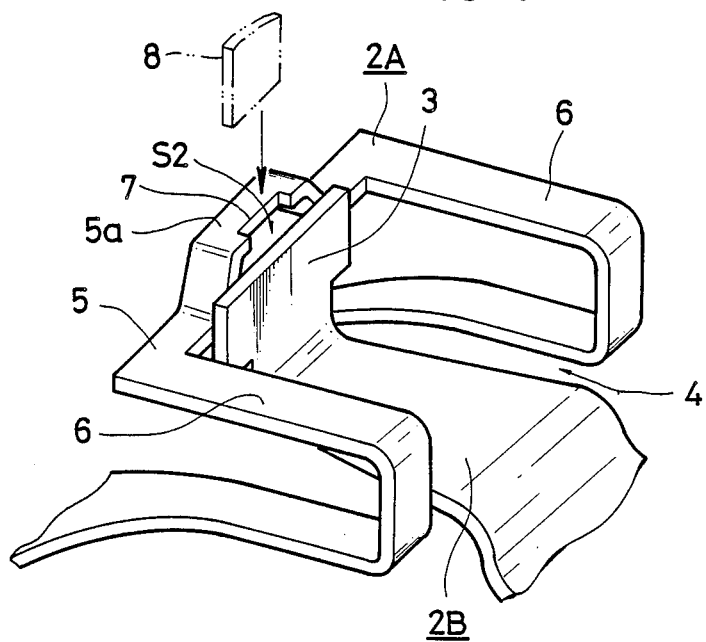
FIG. 4 is a partially cutaway enlarged perspective view illustrating a second tool insertion space used for disengagement between the engaging tongue piece and the lock wall.
Figure 5:
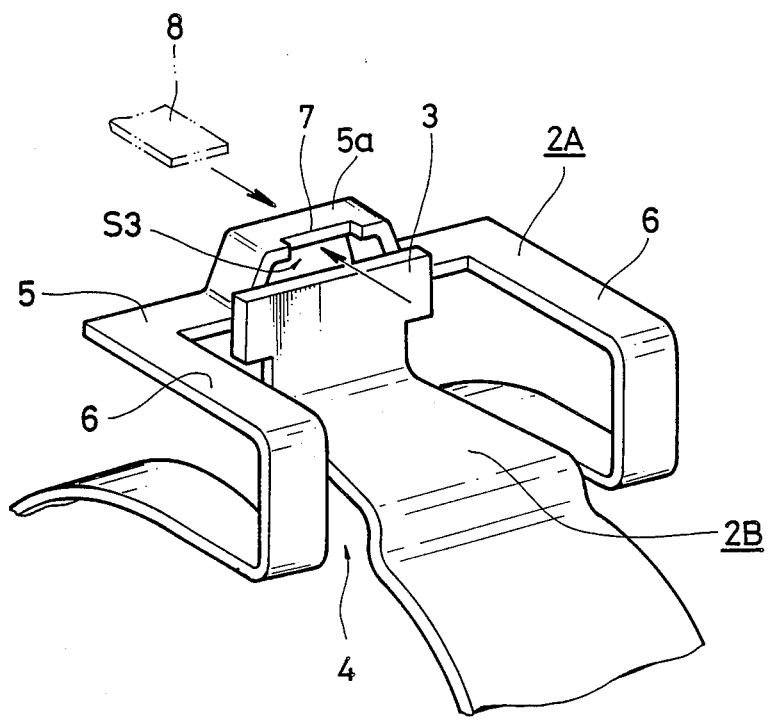
FIG. 5 is a partially cutaway enlarged perspective view illustrating a third tool insertion space used for disengagement between the engaging tongue piece and the lock wall.

With the construction described above, there are defined a first tool insertion space S1 between the upper and lower side pieces 6a and 6b of the U-shaped side wall 6 as illustrated in FIG. 3, a second tool insertion space S2 between the notch 7 and the front surface of the engaging tongue piece 3 as illustrated in FIG. 4, and a third tool insertion space S3 between the lower surface of the protruding central part 5a of the lock wall 5 and the upper end of the engaging tongue piece 3 as illustrated in FIG. 5. These tool insertion spaces S1, S2 and S3 are utilized in disengaging the engaging tongue piece 3 from the lock wall 5.

This is to say, a simple tool 8 such a a slotted screwdriver is inserted through any one of the tool insertion spaces S1, S2 and S3 in the most desirable direction and pushes the second terminal portion 2B down, thereby disengaging the engaging tongue piece 3 from the lock wall 5 of the first terminal portion 2A.

Figure 2:
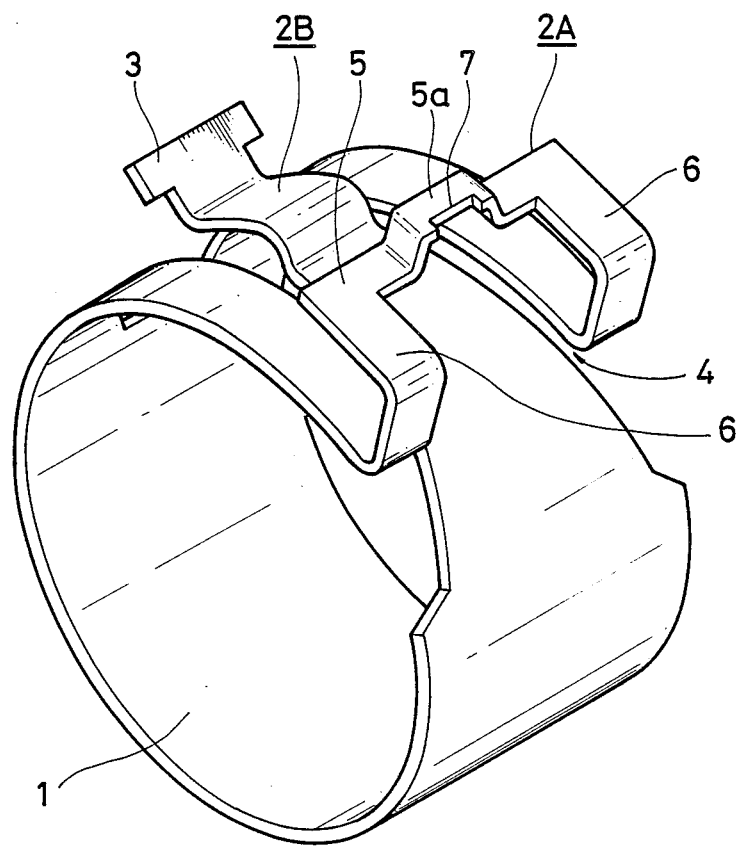
FIG. 2 is a perspective view illustrating the hose clamp, with the clamp body held in a radially contracted state.

A rubber hose (not shown) can be clamped automatically with the hose clamp of the aforementioned construction by setting the clamp body 1 into a radially expanded state as illustrated in FIG. 1 in which the engaging tongue piece 3 of the second terminal portion 2B abuts against the lock wall 5 of the first terminal portion 2A, taking firm hold of the opposite side walls 6 of the first terminal portion 2A with a tool (not shown) such as pliers, for example, inserting the clamp body 1 around the rubber hose, then depressing the second terminal portion 2B downwardly with the leading end of the simple tool 8 such as a slotted screwdriver, thereby releasing the engaging tongue piece 3 of the second terminal portion 2B from the engagement thereof with the lock wall 5 of the first terminal portion 2A to move the second terminal portion 2B inside the guide opening 4 by virtue of the resilient force of the clamp body 1, and permitting the clamp body 1 to contract radially instantaneously as illustrated in FIG. 2.

The tool insertion spaces S1, S2 and S3 for permitting insertion of the leading end of the tool 8 are formed by utilizing the positional relation between the shapes of the first and second terminal portions 2A and 2B. When the first tool insertion space S1 defined between the upper and lower side pieces 6a and 6b of the side wall 6 permits easy insertion of the tool 8, for example, the engagement between the engaging tongue piece 3 of the second terminal portion 2B and the lock wall 5 of the first terminal portion 2A can be easily released by inserting the leading end of the tool 8 in the lateral direction between the upper and lower side pieces 6a and 6b as illustrated in FIG. 3 and wrenching the tool 8 and simultaneously depressing the second terminal portion 2B downwardly with the tool 8.

When the second tool insertion space S2 defined between the notch 7 in the protruding central part 5a of the lock wall 5 and the front surface of the engaging tongue piece 3 permits easy insertion of the tool 8, for example, the engaging tongue piece 3 can be easily disengaged from the lock wall 5 by inserting the leading end of the tool 8 into the notch 7 downwardly from above the clamp body 1 as illustrated in FIG. 4 and wrenching the tool 8 and, at the same time, depressing the engaging tongue piece 3 downwardly with the tool. When the third tool insertion space S3 defined between the lower surface of the protruding central part 5a of the lock wall 5 and the upper end of the engaging tongue piece 3 permits easy insertion of the tool 8, for example, the engagement of the engaging tongue piece 3 with the lock wall 5 can be easily broken by inserting the leading end of the tool 8 in the lateral direction into the third tool insertion space S3 as illustrated in FIG. 5 and depressing the engaging tongue piece 3 downwardly with the tool 8.

Therefore, even when the direction for insertion of the tool 8 is restricted by the position for connection of a rubber hose or by the condition of fixation of the hose clamp itself, one tool insertion space permitting easy insertion of the tool 8 may be suitably selected from among the first, second and third tool insertion spaces S1, S2 and S3, and the leading end of the tool 8 may be inserted through the selected tool insertion space. Unlike the conventional hose clamps, the hose clamp of the present invention has absolutely no possibility of rendering the work of insertion of a tool difficult or impracticable. This permits the work of clamping a rubber hose to be carried out very easily.

The clamp 1 contracted by the disengagement between the engaging tongue piece 3 of the second terminal portion 2B and the lock wall 5 of the first terminal portion 2A can be forcibly expanded radially by bringing the lock wall 5 and the engaging tongue piece 3 into mutual abutment with such a tool as pliers (not shown). Thus, the hose clamp of the present invention can be reset for alteration of the clamping position or for reuse of the hose clamp. Owing to the construction of the hose clamp, the sections of the two terminal portions 2A and 2B of the clamp body 1 which are raised upright can be formed in a relatively small height. Unlike the conventional hose clamps, therefore, the hose clamp of the present invention effectively precludes the accidents heretofore possibly encountered during or after the work of clamping a rubber hose. The sections so raised upright are sufficient for being nipped with a tool for the purpose of reuse of the hose clamp.

As is clear from the above, the hose clamp of the present invention is constructed by bending the second terminal portion of the clamp body in the radial direction to form the engaging tongue piece on the second terminal portion, folding the first terminal portion of the clamp in a substantially U-shaped cross section, perforating the guide opening for permitting motion therein of the engaging tongue piece in the first terminal portion so that the guide opening extends midway the clamp body, forming the lock wall at the leading end of the first terminal portion devoid of the guide opening, and enabling the engaging tongue piece of the second terminal portion to be brought into engagement with the lock wall of the first terminal portion, and is characterized by the first tool insertion space defined between the upper and lower side pieces of the side wall of the first terminal portion, second tool insertion space defined between the notch in the protruding central part of the lock wall and the front surface of the engaging tongue piece, and third tool insertion space defined between the lower surface of the protruding central part of the lock wall and the upper end of the engaging tongue piece. In the present invention, therefore, there is absolutely no possibility of the condition of fixation of the hose clamp rendering the insertion of the tool very difficult or even impracticable and impairing its workability.

What is claimed is:

1. A hose clamp comprising:
   an annular clamp body having a first terminal portion and a second terminal portion;
   said first terminal portion comprising side walls, a guide opening defined between said side walls, a leading end, and a lock wall defined between said guide opening and said leading end, said lock wall having a protruding central portion, said protruding central portion having a notch therein, and said side walls bending back over themselves defining a substantially U-shaped portion having an upper portion and a lower portion;
   said second terminal portion comprising an engaging tongue piece for abutting said lock wall to maintain said annular clamp body in a radially expanded state, said engaging tongue piece defined by a wall bent radially outwardly with respect to said annular clamp body;
   said upper and lower portions defining therebetween a first space for permitting insertion of a tool from forward and rear sides of said annular clamp body, a lower surface of said protruding central portion and an upper end surface of said engaging tongue piece defining therebetween a second space for permitting insertion of a tool from opposite lateral sides of said annular clamp body when said engaging tongue piece abuts against said lock wall to maintain said annular clamp body in a radially expended state, and said notch and a forward surface of said engaging tongue piece defining therebetween a third space for permitting insertion of a tool from a top side of said clamp body when said engaging tongue piece abuts against said lock wall to maintain said clamp body in a radially expanded state;
   whereby when said annular clamp body is in a radially expanded state, said annular clamp body can be contracted for clamping a hose by releasing the abutting relation between said engaging tongue piece and said lock wall by operating a tool from any one of the forward, rear, laterally opposite, and top sides to move said engaging tongue piece within said guide opening.

* * * * *